United States Patent
Manchanda et al.

(10) Patent No.: US 10,959,246 B1
(45) Date of Patent: Mar. 23, 2021

(54) MANAGEMENT OF CHANNEL STATE INFORMATION REPORTING RATE IN A COMMUNICATIONS SYSTEM

(71) Applicant: Sprint Spectrum L.P., Overland Park, KS (US)

(72) Inventors: Nitesh Manchanda, Overland Park, KS (US); Ryan P. Dreiling, Shawnee, KS (US); Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 404 days.

(21) Appl. No.: 15/056,455

(22) Filed: Feb. 29, 2016

(51) Int. Cl.
*H04W 72/02* (2009.01)
*H04W 72/12* (2009.01)
*H04W 24/10* (2009.01)
*H04W 24/02* (2009.01)

(52) U.S. Cl.
CPC ....... *H04W 72/1236* (2013.01); *H04W 24/02* (2013.01); *H04W 24/10* (2013.01); *H04W 72/1252* (2013.01)

(58) Field of Classification Search
CPC ......... H04W 28/0205; H04W 28/0231; H04W 72/02
See application file for complete search history.

(56) References Cited

U.S. PATENT DOCUMENTS

| | | | |
|---|---|---|---|
| 8,233,406 B1 | 7/2012 | Johnson et al. | |
| 8,264,978 B1 | 9/2012 | Srinivas et al. | |
| 8,773,307 B2 | 7/2014 | Chang et al. | |
| 8,929,195 B1 | 1/2015 | Yarkosky et al. | |
| 9,042,323 B1 | 5/2015 | Marupaduga et al. | |
| 9,106,284 B1 | 8/2015 | Scott et al. | |
| 2013/0114455 A1* | 5/2013 | Yoo | H04W 72/082 370/252 |
| 2016/0065290 A1* | 3/2016 | Zhu | H04W 72/0413 370/329 |
| 2016/0359538 A1* | 12/2016 | Onggosanusi | H04B 7/0469 |
| 2017/0237535 A1* | 8/2017 | Park | H04L 5/0035 370/329 |

OTHER PUBLICATIONS

4G Americas, "MIMO and Smart Antennas for Mobile Broadband Systems," Jun. 2013, 42 pages.
Rohde & Schwartz, "LTE Transmission Modes and Beamforming—White Paper," Jul. 2015, 25 pages.
Co-Pending U.S. Appl. No. 14/881,724, filed Oct. 13, 2015, "Management of Channel State Information Reporting Rate in a Communications System".
Co-Pending U.S. Appl. No. 14/933,626, filed Nov. 5, 2015, "Management of Channel State Information Reporting Rate in a Communication System".

* cited by examiner

Primary Examiner — Sulaiman Nooristany (57) ABSTRACT

According to aspects of the disclosure, a method and system are provided for managing signaling in a wireless communication network. In accordance with the disclosure, a base station radiates to provide an antenna radiation pattern defining a coverage area, and the base station serves a UE in the coverage area defined by the antenna radiation pattern. The base station also selects, based on the determined antenna radiation pattern, a CSI reporting rate. Responsive to the selection of the CSI reporting rate, the base station causes the UE to periodically report CSI to the base station according to the selected CSI reporting rate.

20 Claims, 8 Drawing Sheets

MANAGEMENT OF CHANNEL STATE INFORMATION REPORTING RATE IN A COMMUNICATIONS SYSTEM

BACKGROUND

Unless otherwise indicated herein, the description provided in this section is not itself prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). To facilitate this, the base station may have one or more antennas that provide one or more radiation patterns defining the coverage areas.

In general, each coverage area may operate on one or more carriers each defining one or more ranges of frequency spectrum and having a respective downlink channel for carrying communications from the base station to UEs and a respective uplink channel for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but are distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide service, and the base station may then schedule particular downlink and uplink resource blocks on that carrier to carry data communications to and from the UE.

When a base station serves a UE, the base station and UE may modulate their air interface data communications at a coding rate selected based on the UE's channel quality, such as with higher coding rate when the UE has better channel quality and with a lower coding rate when the UE has worse channel quality. Further, while the base station serves the UE, the UE's channel quality may change for a variety of reasons such as, for example, due to channel fading or multipath (i.e., a condition in which a signal reaches an antenna by two or more paths causing interference that can reduce the signal-to-noise ratio of the signal received by the antenna). To determine the channel quality for a UE, the base station may employ a channel state feedback reporting procedure. For instance, in an LTE system, the UE periodically reports to the base station channel state information (CSI), which includes, among other things, a channel quality indicator (CQI) that takes into account factors such as signal-to-noise ratio, antenna configuration, UE receiver type, and so forth. The UE determines the CSI based, at least in part, on downlink transmissions, and the UE reports the CSI to the base station using uplink channels at regular intervals specified by the base station (i.e., according to a specified "CSI reporting rate"). The base station may then determine from the reported CSI a particular coding rate to use for communication with the UE, and the base station may allocate air interface resources and schedule transmissions of data accordingly. It is thus beneficial for the base station to have accurate and up-to-date information of the prevailing channel quality for a UE so that the base station can, among other things, make appropriate decisions as to coding rate.

OVERVIEW

In a typical wireless communication system, the base station may specify the same CSI reporting rate for all UEs in its coverage. Unfortunately, however, a base station may have only a limited extent of uplink resources available to serve UEs. Thus, in some scenarios, depending on the number of UEs served by the base station and the specified CSI reporting rate for those UEs, the uplink may become congested. Generally, when an uplink becomes congested, service may be degraded (e.g., due to latency in allocating uplink resources) and/or the number of UEs served by a base station may be limited. Consequently, it would be desirable to manage the CSI reporting rate specified by a base station for the UEs it serves.

Disclosed herein is a method and system for managing CSI reporting based at least in part on a consideration of an antenna radiation pattern utilized by a base station to serve a UE. In particular, the disclosure provides for determining the antenna radiation pattern utilized by the base station to serve the UE and, based at least in part on the determined antenna radiation pattern, selecting a CSI reporting rate for the UE. The disclosure further provides for causing the UE to then periodically report CSI to the base station according to the selected CSI reporting rate. The disclosure thus provides for dynamically setting and/or adjusting a CSI reporting rate for a UE based on antenna radiation patterns utilized for communication with the UE.

Depending on a physical configuration of an antenna radiation pattern (e.g., a size and/or shape of the antenna radiation pattern), a UE's channel conditions may be more or less likely to vary when the UE is served using that antenna radiation pattern. In some aspects, if the determined antenna radiation pattern has a physical configuration that is relatively more likely to cause a UE to experience variations in channel quality, then a relatively high CSI reporting rate may be selected for the UE. Whereas, if the determined antenna radiation pattern has a physical configuration that is relatively less likely to cause the UE to experience variations in channel quality, then a relatively low CSI reporting rate may be selected for the UE. This may help the base station receive CSI reports more often for UEs that are more likely to experience variations in channel quality, and thereby facilitate more frequent fine-tuning of communication parameters (e.g., coding rate) to account for such UEs' channel conditions. Meanwhile, using a lower CSI reporting rate for UEs that are less likely to experience variations in channel quality may beneficially affect congestion on the uplink in some scenarios.

Accordingly, in one respect, disclosed is a method operable by a communication system to manage CSI reporting. In accordance with the method, a base station radiates to provide an antenna radiation pattern defining a coverage area, and the base station serves a UE in the coverage area defined by the antenna radiation pattern. The base station also selects, based on the antenna radiation pattern, a CSI reporting rate. Responsive to such selection, the base station causes the UE to periodically report CSI to the base station according to the selected CSI reporting rate.

In another respect, disclosed is a base station that includes an antenna structure for communicating over an air interface with a UE, and a controller configured to manage communication via the antenna structure over the air interface. The controller is configured to: (i) cause the antenna structure to provide an antenna radiation pattern defining a coverage area, (ii) serve the UE in the coverage area defined by the antenna radiation pattern, (iii) select, based on the antenna radiation pattern, a CSI reporting rate, and (iv) responsive to the selection of the CSI reporting rate, cause the UE to periodically report CSI to the base station according to the selected CSI reporting rate.

In still another respect, disclosed is a method operable by a communication system to manage CSI reporting. In accordance with the method, a base station radiates to provide a first antenna radiation pattern defining a first coverage area and a second antenna radiation pattern defining a second coverage area. The second antenna radiation pattern is different than the first antenna radiation pattern. The base station serves a first UE in the first coverage area defined by the first antenna radiation pattern and a second UE in the second coverage area defined by the second antenna radiation pattern. The base station also selects a first CSI reporting rate based on the first antenna radiation pattern and, responsive to the selection of the first CSI reporting rate, causes the first UE to periodically report CSI to the base station according to the first CSI reporting rate. The base station further selects a second CSI reporting rate based on the second antenna radiation pattern and, responsive to the selection of the second CSI reporting rate, causes the second UE to periodically report CSI to the base station according to the second CSI reporting rate. The second CSI reporting rate is different than the first CSI reporting rate.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
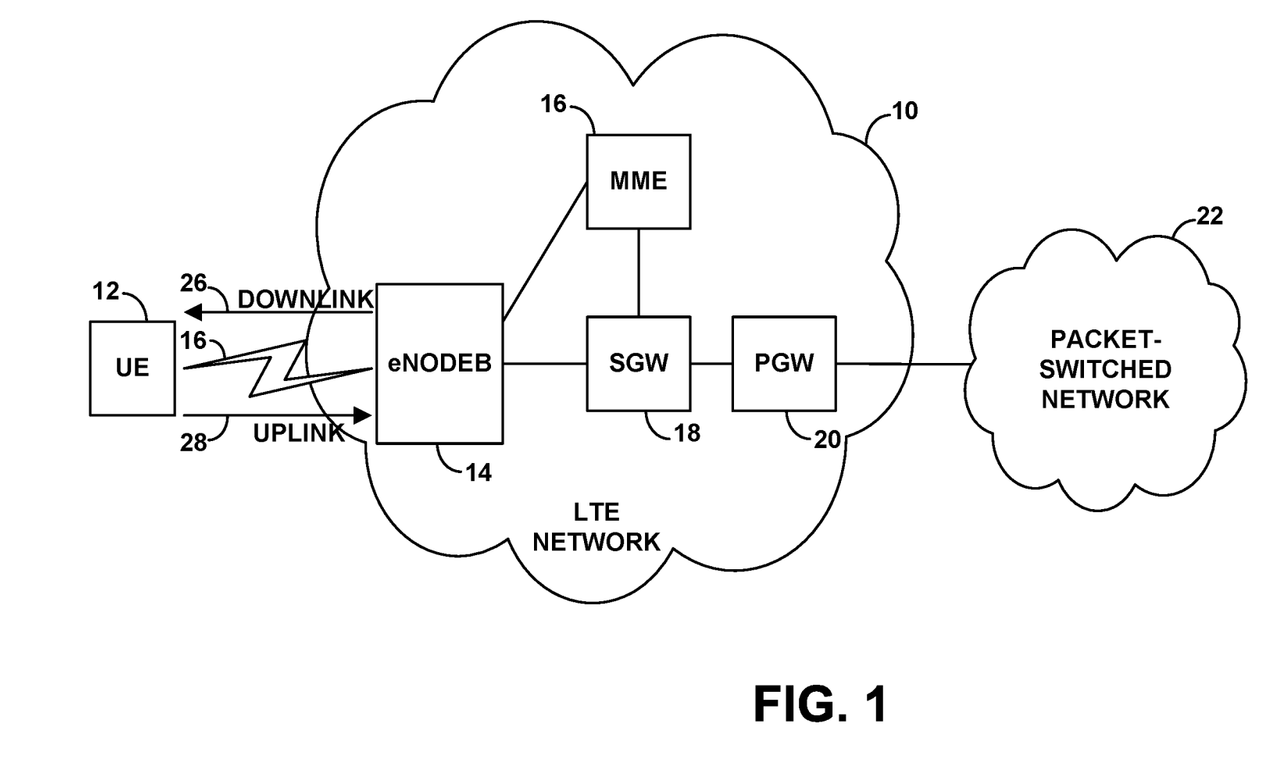
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs (e.g., a representative UE 12) with wireless packet data communication service, including possibly voice-over-packet service, but may also provide other functions. As shown, the LTE network 10 includes a base station (eNodeB) 14, which has an antenna structure and associated equipment for providing an LTE coverage area 16 in which to serve the UE 12. The eNodeB 14 then has a communication interface with a mobility management entity (MME) 16. Further, the eNodeB 14 has a communication interface with a serving gateway (SGW) 18, which in turn has a communication interface with a packet-data network gateway (PGW) 20 that provides connectivity with a packet-switched network 22, and the MME 16 has a communication interface with the SGW 18. In practice, the illustrated components of the LTE network 10 may sit as nodes on a private packet-switched network owned by an operator of the LTE network 10, and thus the various communication interfaces may be logical interfaces through that network.

As illustrated, the air interface of coverage area 16 defines a downlink direction 26 from the eNodeB 14 to the UE 12 and an uplink direction 28 from the UE 12 to the eNodeB 14. Further, the eNodeB 14 and the UE 12 may be configured (e.g., licensed and programmed) to support air interface communication on various particular carriers, which may be FDD or TDD.

According to LTE, each carrier's downlink channel may then define various sub-channels, such as a physical downlink control channel (PDCCH) for carrying scheduling directives and other control signaling from the eNodeB 14 to the UE 12, a physical downlink shared channel (PDSCH) for carrying scheduled downlink data communication, and a reference channel for carrying a reference signal that the UE 12 can monitor to evaluate coverage quality. Likewise, each carrier's uplink channel may define various sub-channels, such as a physical uplink control channel (PUCCH) for carrying scheduling requests, periodic CSI reports, and other control signaling from the UE 12 to the eNodeB 14 and a physical uplink shared channel (PUSCH) for carrying scheduled uplink data communication.

In practice, the antenna structure of the eNodeB 14 can include one or more antennas arranged to provide one or more antenna radiation patterns, which define one or more coverage areas (e.g., the coverage area 16). The antennas can include any type of antenna or antenna configuration such as, for example, an omni-directional antenna, a directional antenna (e.g., a sector antenna), an antenna array, and/or a smart antenna. In some implementations, the antennas may work together to provide a specific antenna radiation pattern. In particular, the antennas may each radiate radio waves, which may constructively and destructively interfere with each other to produce the antenna radiation pattern. The antenna radiation pattern may thus have a physical configuration of a particular size and shape in space, which characterizes how the antennas collectively radiate radio frequency energy.

Also in practice, the eNodeB 14 may produce a variety of antenna radiation patterns having physical configurations that can take a variety of forms. For example, the physical configurations of the antenna radiation patterns may vary in size from relatively small to relatively large. As another example, the physical configurations of the antenna radiation patterns may vary in directivity from relatively narrowly focused to relatively widely focused in a particular direction (i.e., a relatively narrow beam width to a relatively wide beam width). Further, for example, the physical configurations of the antenna radiation patterns may vary in range (i.e., distance to a farthest edge of the pattern) from relatively near to the antenna structure to relatively far from the antenna structure. As yet another example, the physical configurations of the antenna patterns may vary with respect to range consistency from a shape having a relatively few number of undulations to a shape having a relatively great number of undulations. Physical configurations of antenna radiation patterns may differ from each other in other ways as well.

Figure 2:
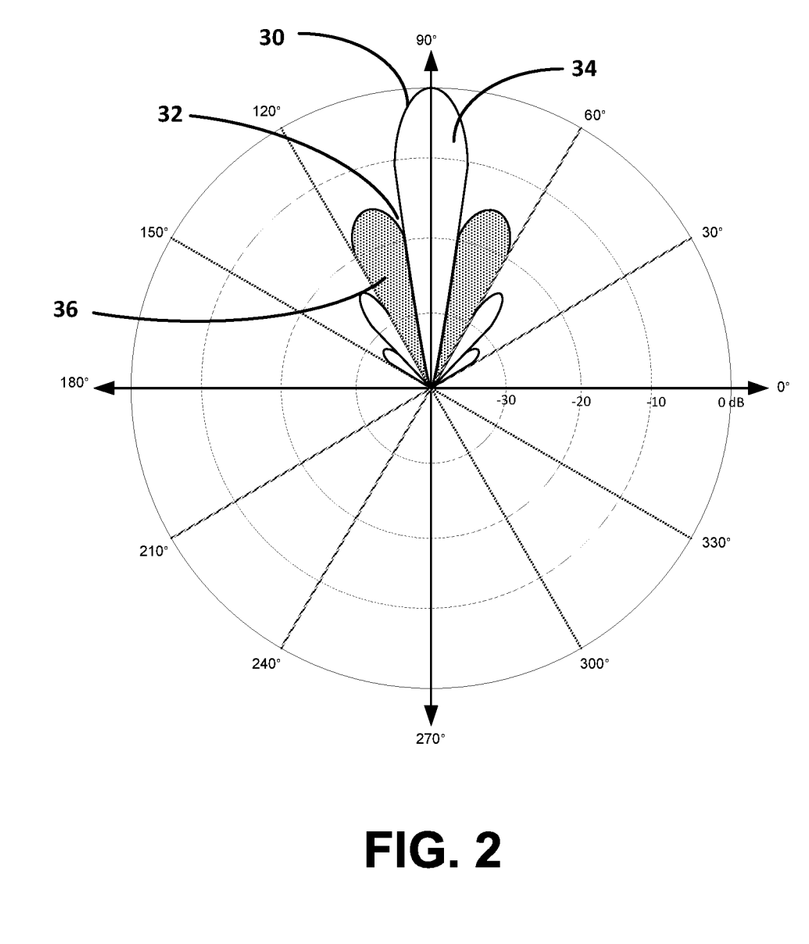
FIG. 2 is a plot of an example antenna radiation pattern.
Figure 3A:
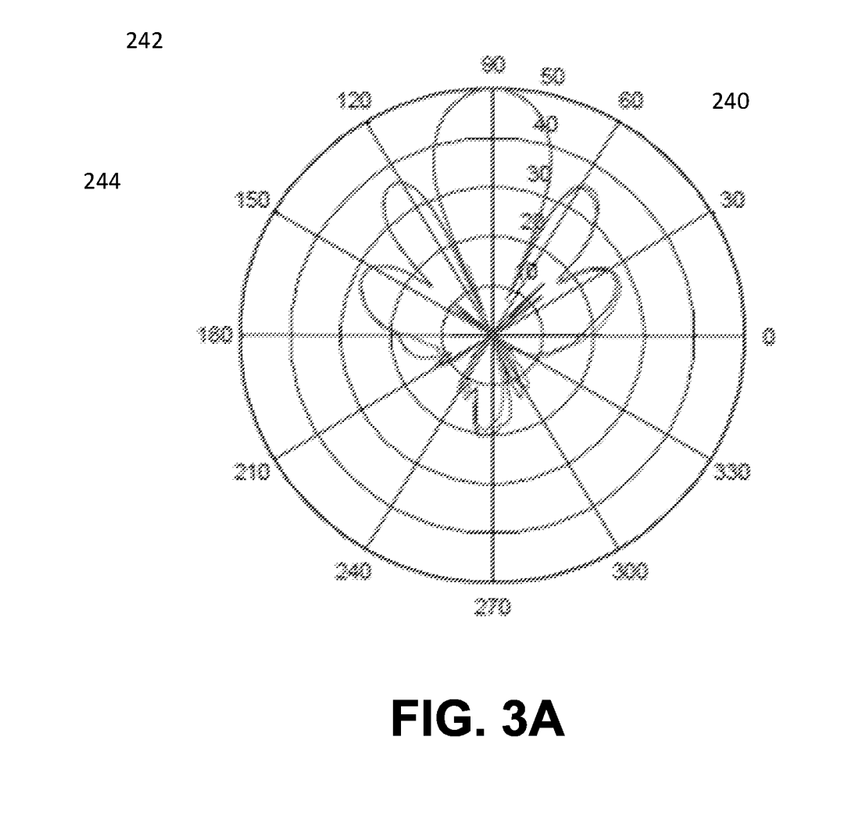
FIG. 3A is a plot of another example antenna radiation pattern.
Figure 3B:
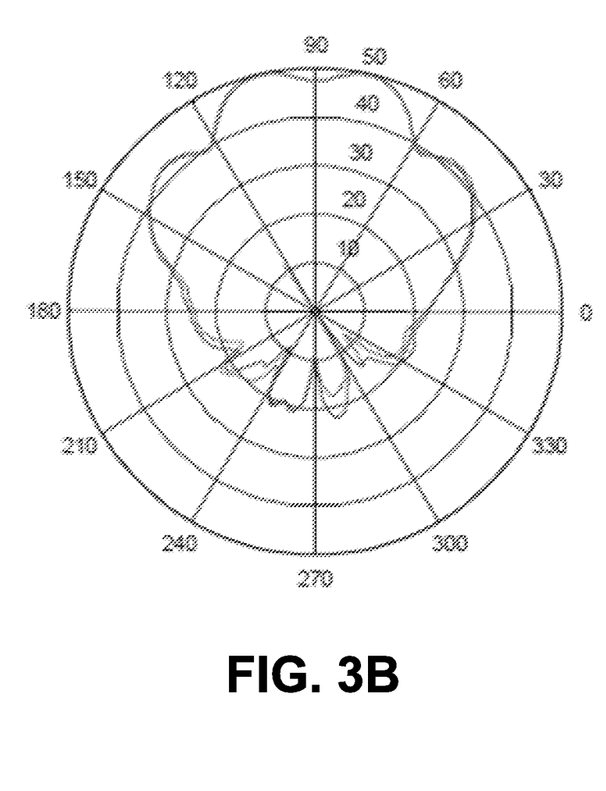
FIG. 3B is a plot of another example antenna radiation pattern.
Figure 3C:
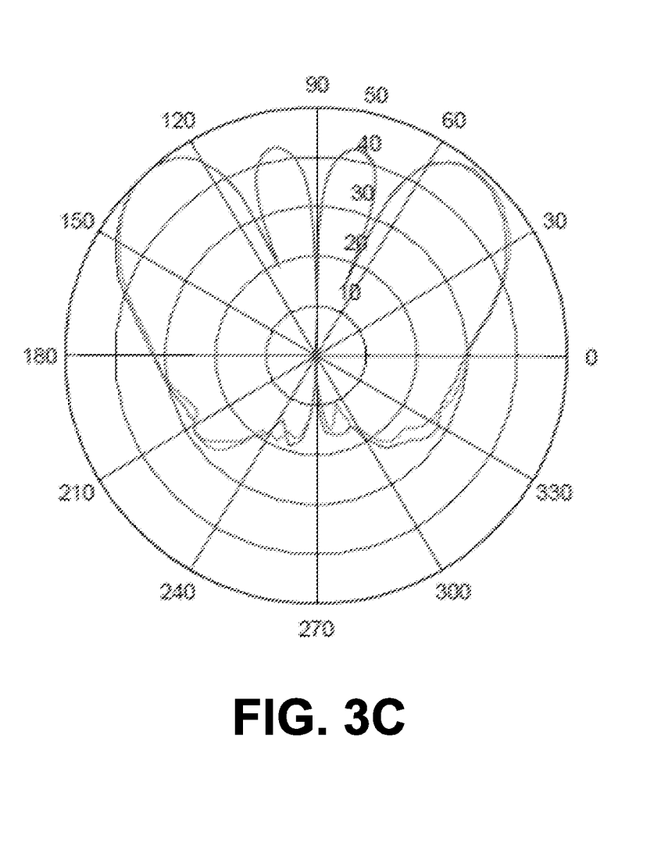
FIG. 3C is a plot of another example antenna radiation pattern.
Figure 3D:
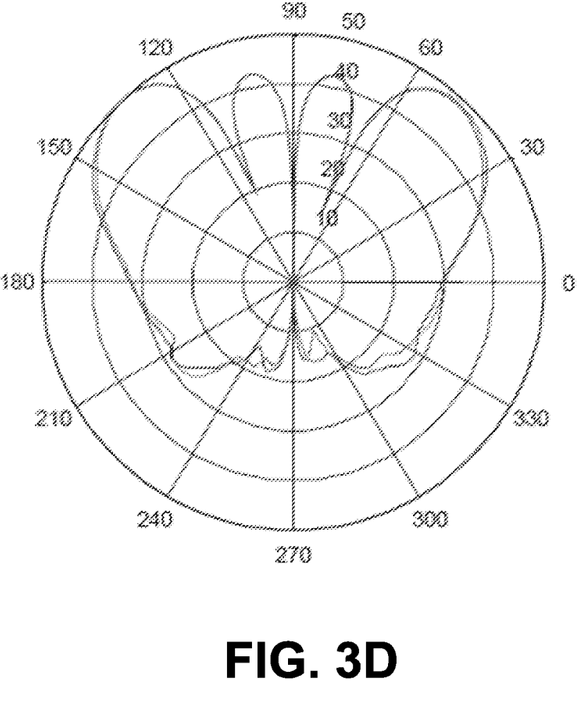
FIG. 3D is a plot of another example antenna radiation pattern.

FIG. 2 is a plot of an antenna radiation pattern 30 according to one example. As shown in FIG. 2, the plot of the antenna radiation pattern 30 includes multiple "lobes" 34 where the radio waves radiated by the antennas constructively interfere with each other and null regions ("nulls") 32 where there is no radiation (e.g., due to radio waves radiated by the antennas destructively interfering with each other). In FIG. 2, the antenna radiation pattern 30 includes a lobe 34 that is larger than the others. This may be the result of the eNodeB 14 controllably operating the antennas in a manner intended to focus radiation in the direction of that lobe 34 (i.e., at 90 degrees). This largest lobe may be referred to as the "main lobe" 34. The other lobes may be referred to as "minor lobes" or "side lobes" 36. In some implementations, there may be more than one main lobe (e.g., in a scenario in which a split-beam antenna is utilized).

As described above, other example antenna radiation patterns may have physical configurations that differ from that shown in FIG. 2. For example, the physical configurations of the antenna radiation patterns that may be provided by the eNodeB 14 may have a greater or fewer number of lobes, a greater or fewer number of nulls, a wider or narrower main lobe, more or less extensive undulations at the edge of the antenna radiation patterns, a larger or smaller coverage area, and/or one or more lobes extending in directions other than those shown (e.g., in a backward direction between 180 degrees and 360 degrees). For instance, FIGS. 3A-3D are plots of different physical configurations for antenna radiation patterns that may be provided by the antenna structure of the eNodeB 14 according to other examples.

The physical configurations of the antenna radiation patterns may depend on various factors such as, for instance, the physical configuration of the antennas in the antenna structure (e.g., the number of antennas, the type of antennas, and/or the relative positioning of antennas) and/or the electronic control of the antennas in the antenna structure. For example, the eNodeB 14 may selectively produce a particular antenna radiation pattern by controlling the relative amplitudes and/or phases of the signals transmitted and/or received by the antennas in the antenna structure to provide for constructive interference in a desired direction and perhaps destructive interference in other directions. As another example, the eNodeB 14 may physically control the direction in which the antennas are arranged to selectively provide a particular antenna radiation pattern. For instance, each antenna may be mounted on a stepper motor, which may change the direction (e.g., tilt and/or azimuth) in which that antenna transmits and/or receives signals. As yet another example, the antenna structure may provide generally omni-directional coverage and may have a programmatically controllable power output so as to dynamically vary the range of its radiation pattern. Other examples may also be possible.

The eNodeB 14 may thus physically or electronically control various aspects of the antenna structure to produce various antenna radiation patterns for serving UEs. To controllably produce a particular antenna radiation pattern, the eNodeB 14 may utilize one or more radiation pattern parameters, which specify how the eNodeB 14 may control such aspects of the antenna structure. For example, the one or more radiation pattern parameters may specify a relative phase, amplitude, tilt, and/or azimuth of each antenna of the antenna structure for a given antenna radiation pattern. As another example, in LTE, some antenna radiation patterns may be specified by a set of beamforming coefficients in which each coefficient is a complex constant representing a relative amplitude and phase shift for a respective one of the antennas in a phased array of antennas. Other example parameters may also be possible.

In an example implementation, the eNodeB 14 may include or have access to a table that maps various antenna radiation patterns to corresponding radiation pattern parameters, and the eNodeB 14 may be programmed to refer to that table to determine the radiation parameter(s) corresponding to a desired antenna radiation pattern. The eNodeB 14 may then impose the determined parameter(s) to transmit and/or receive signals on the antennas of the antenna structure according to the desired antenna radiation pattern.

According to aspects of the disclosure, the eNodeB 14 may serve different UEs using different antenna radiation patterns. There may be a variety of reasons for doing this such as, for example, because the UEs are located in different geographic areas serviced by the eNodeB 14 and/or because the UEs have a variety of different antenna configurations. When serving different UEs using different antenna radiation patterns, the eNodeB 14 may specify different CSI reporting rates for different UEs based at least in part on the antenna radiation patterns used to serve the UEs as described above.

Additionally or alternatively, while serving a particular UE, the eNodeB 14 may adjust the antenna radiation pattern it uses to serve the UE, for example, in an effort to provide better coverage in a specific area in which the UE may be operating (e.g., an edge of coverage area 16). The eNodeB 14 may controllably adjust the antenna radiation pattern by adjusting the radiation pattern parameters.

In line with the discussion above, while the eNodeB 14 serves the UE 12, the UE 12 may periodically determine its channel quality based on downlink transmissions (e.g., downlink reference signal strength) and perhaps one or more other factors (e.g., UE's capabilities), and the UE 12 may periodically transmit to the eNodeB 14 (on the PUCCH) a CSI report including a CQI that indicates the UE's determined channel quality, a pre-coding matrix indicator (PMI), and/or a rank indicator (RI). Further, in line with the discussion above, the UE 12 periodically transmits the CSI report(s) to the eNodeB 14 on the PUCCH according to a CSI reporting rate specified by the eNodeB 14. The eNodeB 14 may specify the CSI reporting rate in one or more operational parameters provided to the UE 12 to facilitate operation of the UE 12 in its coverage area. For example, the eNodeB 14 may specify a CSI reporting rate via operational parameters CQI-PMI-ConfigIndex and/or RI-ConfigIndex, which determine how often the UE 12 reports CQI and PMI on the PUCCH and how often the UE 12 reports RI on the PUCCH, respectively.

In some aspects, the eNodeB 14 may provide operational parameters to the UE 12 in a broadcast message, such as a system parameter message or system information block (e.g., a LTE System Block #8 (SIB8) information) that the eNodeB 14 broadcasts generally for its served UEs (including the UE 12) to receive. In additional or alternative aspects, the eNodeB 14 may provide operational parameters to the UE 12 in control messages transmitted specifically to the UE 12, such as in radio resource control (RRC) messages for instance. The UE 12 may thus be configured to monitor for communications from the eNodeB 14 to read broadcast and/or control messages so as to receive and then operate in accordance with the specified operational parameters, including the specified CSI reporting rate.

As noted above, the present disclosure provides for dynamically managing the CSI reporting rate for a UE based, at least in part, on a consideration of an antenna radiation pattern utilized by an eNodeB for serving the UE. This process can be carried out by the eNodeB 14 itself and/or by one or more other network entities, such as with portions of the analysis carried out by an entity outside of the eNodeB 14 (e.g., the MME 16) and the eNodeB 14 then responsively causing the UEs to report CSI according to the analysis. For simplicity, however, the process will be described here in a scenario where the eNodeB 14 carries out all aspects of the process.

An implementation of this process may begin in a scenario where the eNodeB 14 is radiating to provide an antenna radiation pattern defining a coverage area 16, and the eNodeB 14 serves a UE 12 in that coverage area 16. While serving the UE 12 in this manner, the eNodeB 14 may determine the antenna radiation pattern provided by the eNodeB 14 to serve the UE 12. For example, the eNodeB 14 may determine the antenna radiation pattern based on a determination of one or more radiation pattern parameters used by the eNodeB 14 to control the antennas producing the antenna radiation pattern.

Once the eNodeB 14 determines the antenna radiation pattern provided by the eNodeB 14 to serve the UE 12, the eNodeB 14 may then select a CSI reporting rate for the UE 12 based on the determined antenna radiation pattern. To do this, the eNodeB 14 may include or have access to a table that maps various antenna radiation patterns to corresponding CSI reporting rates, and the eNodeB 14 may be programmed to refer to that table to select the CSI reporting rate that will be utilized by the UE 12 for reporting CSI.

For example, the table may map radiation pattern parameters to corresponding CSI reporting rates. In some implementations, each set of radiation pattern parameters may correspond with a different CSI reporting rate in the table. In other implementations, the table may map the more than one set of antenna radiation patterns to the same CSI reporting rate.

Table 1 below provides an example mapping between CSI reporting rates and a set of radiation pattern parameters for producing the example antenna radiation patterns depicted in FIGS. 3A-3D. In Table 1, each radiation pattern parameter is a complex constant representing a relative amplitude and phase shift for a respective one of the antennas in a phased array of antennas.

TABLE 1

| FIG. | Parameter 1 | Parameter 2 | Parameter 3 | Parameter 4 | CSI Reporting Rate |
|---|---|---|---|---|---|
| 3A | 1 | 1 | 1 | 1 | High |
| 3B | −1 | 1 | 1 | 1 | Low |
| 3C | 1 | −1 | 1 | 1 | Medium |
| 3D | 1 | −1 | 1 | −1 | Medium |

Depending on a physical configuration of an antenna radiation pattern (e.g., a size and/or shape of the antenna radiation pattern), a UE's channel conditions may be more or less likely to vary when the UE is served using that antenna radiation pattern. In some aspects, the table may map antenna radiation patterns having physical configurations that are relatively more likely to cause a UE to experience variations in channel quality to relatively high CSI reporting rates, and the table may map antenna radiation patterns having physical configurations that are relatively less likely to cause a UE to experience variations in channel quality to relatively low CSI reporting rates. This may help the eNodeB 14 receive CSI reports more often for UEs that are more likely to experience variations in channel quality, and thereby facilitate more frequent fine-tuning of communication parameters (e.g., coding rate) to account for such UEs' channel conditions. Meanwhile, using a lower CSI reporting rate for UEs that are less likely to experience variations in channel quality may beneficially affect congestion on the uplink in some scenarios.

In some examples, the correspondence between antenna radiation patterns and CSI reporting rates can be based on one or more aspects of the physical configuration of each antenna radiation pattern such as, for instance, a quantity of lobes, a quantity of nulls, and/or a size of the main lobe(s) (e.g., beam width) of the antenna radiation pattern. In one implementation, an antenna radiation pattern having a relative high quantity of nulls may correspond with a relative high CSI reporting rate and an antenna radiation pattern having a relatively low quantity of nulls may correspond with a relatively low CSI reporting rate. In another implementation, an antenna radiation pattern having a relatively wide beam width (e.g., greater than 90 degrees) may correspond with a relatively high CSI reporting rate and antenna radiation pattern having a relatively narrow beam width (e.g., less than 30 degrees) may correspond with a relatively low CSI reporting rate. In yet another implementation, an antenna radiation pattern having a relatively narrow beam width may correspond with a relatively high CSI reporting rate and antenna radiation pattern having a relatively wide beam width may correspond with a relatively low CSI reporting rate. Other example implementations are also possible.

Once the eNodeB 14 selects the CSI reporting rate for the UE 12 based on the determined antenna radiation pattern, the eNodeB 14 then causes the UE 12 to periodically report its CSI in accordance with the selected CSI reporting rate. To do so, the eNodeB 14 may transmit an RRC connection reconfiguration message to the UE 12 specifying the selected CSI reporting rate. For example, the eNodeB 14 may specify the selected CSI reporting rate by providing values for operational parameters CQI-PMI-ConfigIndex and/or RI-ConfigIndex in the RRC messages. Additionally or alternatively, the eNodeB 14 may provide operational parameters CQI-PMI-ConfigIndex and/or RI-ConfigIndex to the UE 12 in a broadcast message, such as a system parameter message or system information block that the eNodeB 14 broadcasts generally for its served UEs (including the UE 12) to receive. The UE 12 may monitor for such RRC messages and/or broadcast messages from the eNodeB 14 so as to receive and then operate in accordance with the selected CSI reporting rate.

While the eNodeB 14 continues to serve the UE 12, the eNodeB 14 may change its antenna radiation pattern. Responsive to such change, the eNodeB 14 may repeat the process described above so as to cause the UE 12 to dynamically change its CSI reporting rate based on the change in antenna radiation pattern. For example, the eNodeB 14 may initially serve the UE 12 using a first antenna radiation pattern based upon which the UE 12 reports CSI according to a first CSI reporting rate. The eNodeB 14 may subsequently change from the first antenna radiation pattern to a second antenna radiation pattern, for example, by changing the radiation pattern parameter(s) the eNodeB 14 uses to control transmissions via the antenna structure of the eNodeB 14. Responsive to the eNodeB 14 changing from the first antenna radiation pattern to a second antenna radiation pattern, the eNodeB 14 may select, based on the second antenna radiation pattern, a second CSI reporting rate that is different from the first CSI reporting rate. As described above, the eNodeB 14 may do so using the table that maps radiation pattern parameters to CSI reporting rates. Then, responsive to the eNodeB 14 selecting the second CSI reporting rate, the eNodeB 14 causes the UE 12 to periodically report CSI to the eNodeB 14 according to the selected second CSI reporting rate instead of the first CSI reporting rate.

Additionally, as described above, while serving one UE using a first antenna radiation pattern, the eNodeB 14 may serve another UE using a second antenna radiation pattern different from the first antenna radiation pattern. The eNodeB 14 may thus specify a first CSI reporting rate for the UE served in the coverage area provided by the first antenna radiation pattern and the eNodeB 14 may specify a second CSI reporting rate (which is different than the first CSI reporting rate) for the other UE served in the coverage area provided by the second antenna radiation pattern.

Accordingly, as described above, the disclosure provides for dynamically setting and/or adjusting a CSI reporting rate for a UE based on antenna radiation patterns utilized for serving the UE.

Figure 4:
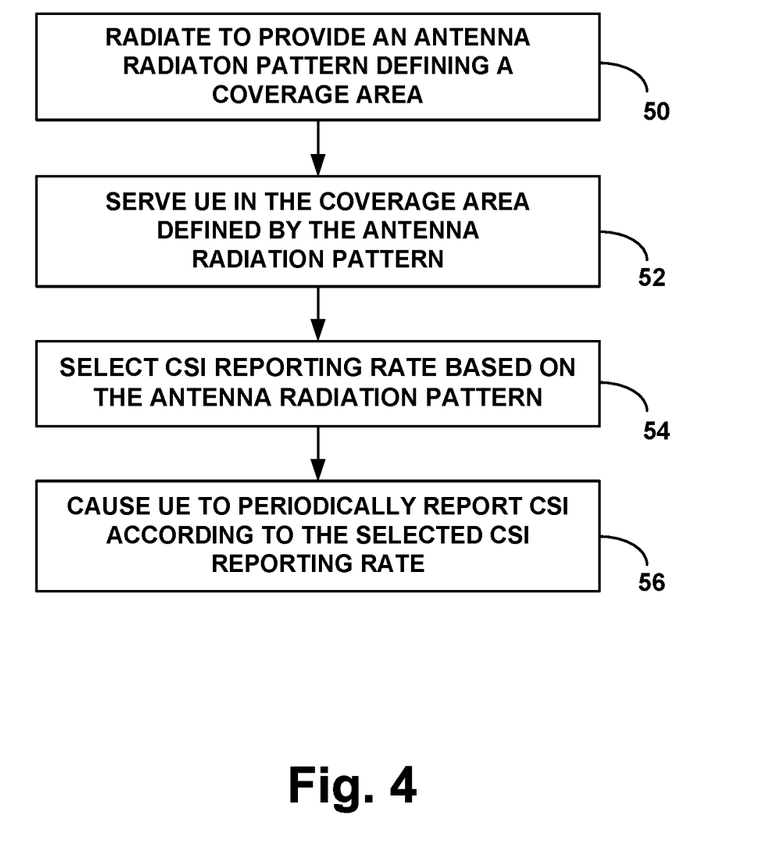
FIG. 4 is a flow chart depicting example operations in accordance with the disclosure.

FIG. 4 is next a flow chart depicting an example set of operations that can be carried out in an implementation of the process according to some aspects of the disclosure. As shown in FIG. 4, at block 50, the method begins with a base station radiating to provide an antenna radiation pattern defining a coverage area. At block 52, the base station serves a UE in the coverage area defined by the antenna radiation pattern. At block 54, the base station selects, based on the antenna radiation pattern, a CSI reporting rate. At block 56, responsive to such selection, the base station causes the UE to periodically report CSI to the base station according to the selected CSI reporting rate.

Figure 5:
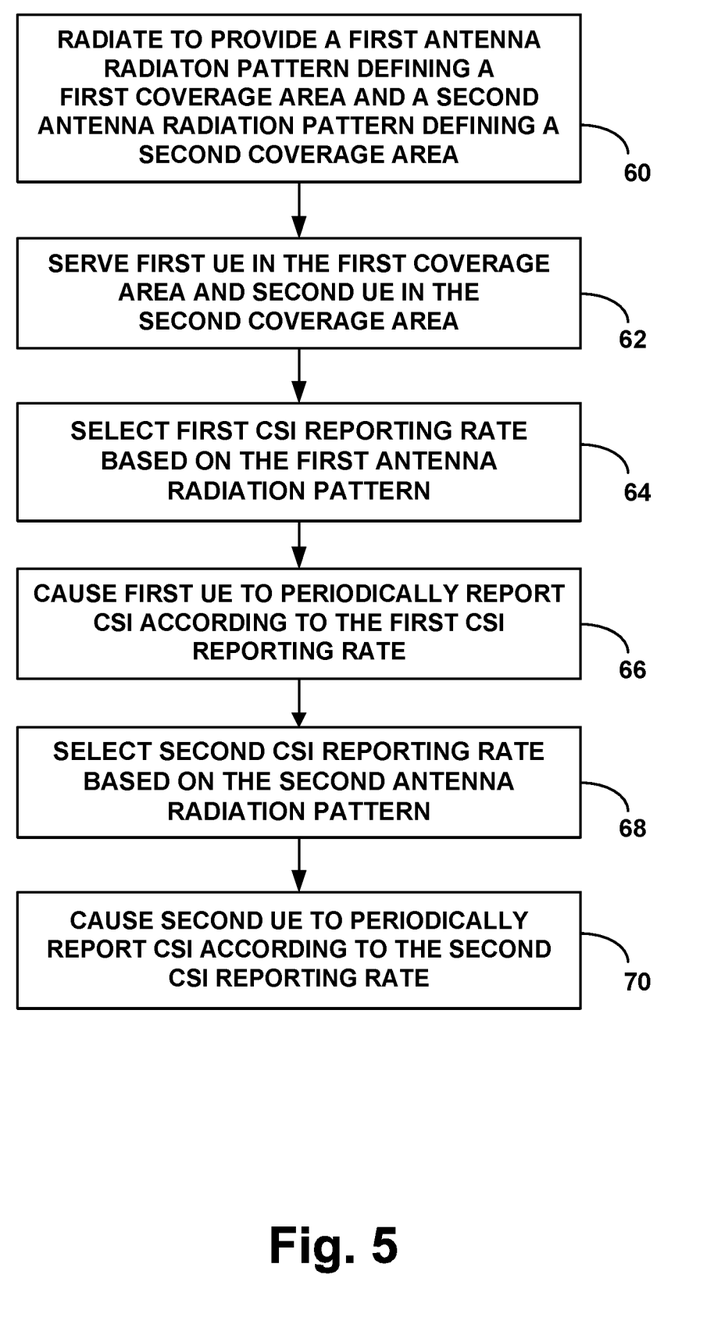
FIG. 5 is another flow chart depicting example operations in accordance with the disclosure.

FIG. 5 is next a flow chart depicting another example set of operations that can be carried out in an implementation of this process. As shown in block 60, the method begins with a base station radiating to provide a first antenna radiation pattern defining a first coverage area and a second antenna radiation pattern defining a second coverage area. The second antenna radiation pattern is different than the first antenna radiation pattern. At block 62, the base station serves a first UE in the first coverage area defined by the first antenna radiation pattern and a second UE in the second coverage area defined by the second antenna radiation pattern. At block 64, the base station selects a first CSI reporting rate based on the first antenna radiation pattern. At block 66, responsive to the selection of the first CSI reporting rate, the base station causes the first UE to periodically report CSI to the base station according to the first CSI reporting rate. At block 68, the base station further selects a second CSI reporting rate based on the second antenna radiation pattern. At block 70, responsive to the selection of the second CSI reporting rate, the base station causes the second UE to periodically report CSI to the base station according to the second CSI reporting rate. The second CSI reporting rate is different than the first CSI reporting rate.

Figure 6:
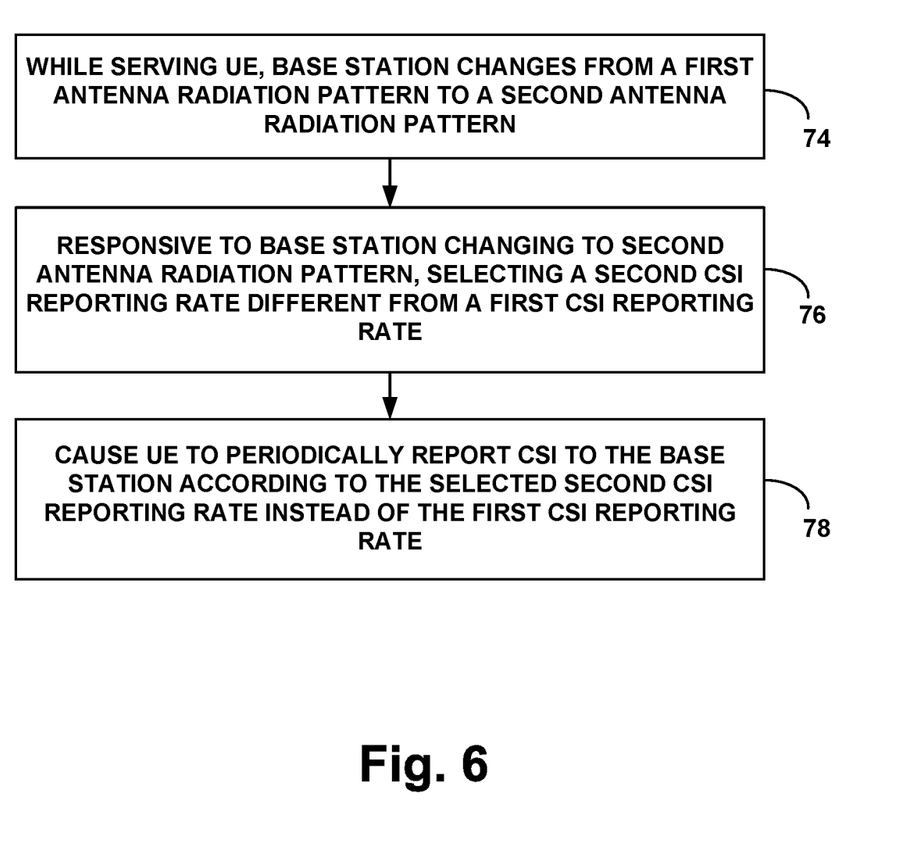
FIG. 6 is another flow chart depicting example operations in accordance with the disclosure.

FIG. 6 is next a flow chart depicting another example set of operations that can be carried out in an implementation of this process. In the illustrated example, the process relates to a scenario in which the base station (e.g., eNodeB 14) is radiating to provide an antenna radiation pattern defining a coverage area, and the base station is serving a UE in the coverage area defined by the antenna radiation pattern. Also, in this scenario, the base station periodically receives, according to a first CSI reporting rate, a report from the UE indicating CSI.

As shown in FIG. 6, at block 74, the process begins with the base station, while serving the UE, changing its antenna radiation pattern from the first antenna radiation pattern to a second antenna radiation pattern different from the first antenna radiation pattern. At block 76, responsive to the base station changing to the second antenna radiation pattern, the base station selects, based on the second antenna radiation pattern, a second CSI reporting rate different from the first CSI reporting rate. At block 78, responsive to selecting the second CSI reporting rate, the base station causes the UE to periodically report CSI to the base station according to the selected second CSI reporting rate instead of the first CSI reporting rate.

Figure 7:
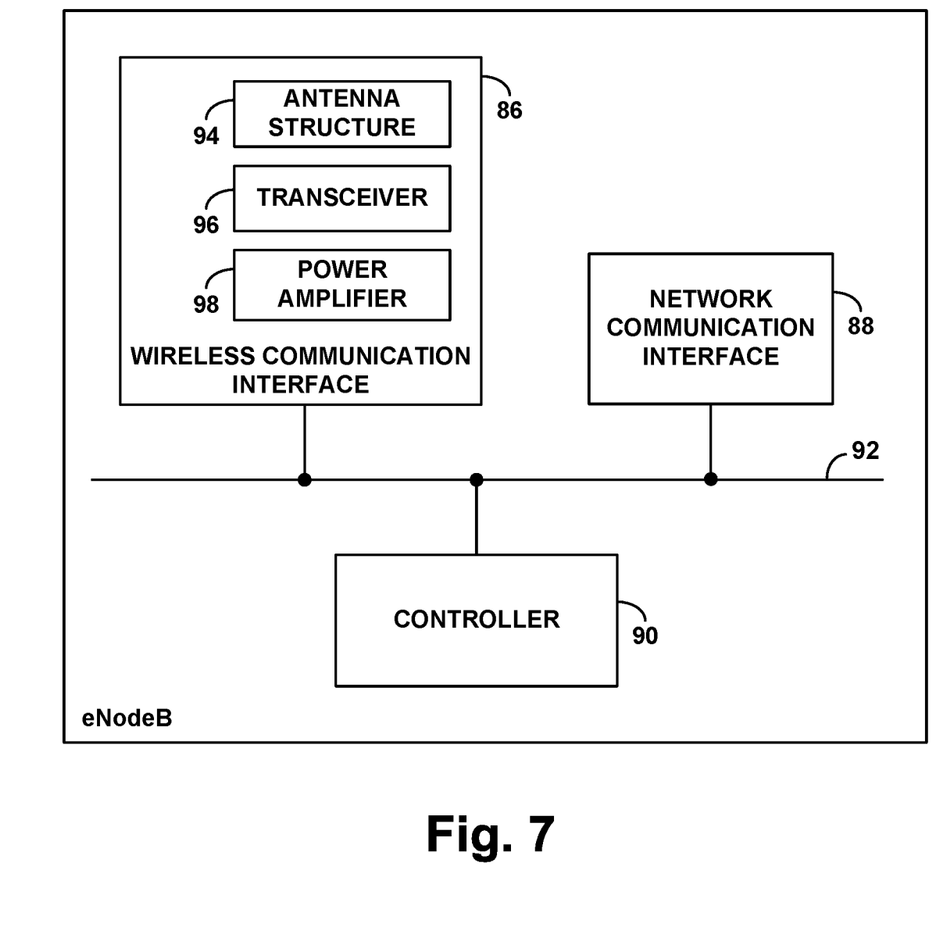
FIG. 7 is a simplified block diagram of an example base station operable in accordance with the disclosure.

FIG. 7 is a simplified block diagram of an example eNodeB (e.g., macro eNodeB, small cell, or other type of base station), showing some of the components that such a device may include in order to carry out these and other operations. As shown, the example eNodeB includes a wireless communication interface 86, a network communication interface 88, and a controller 90, all of which can be integrated together in various ways or, as shown, interconnected with each other through a system bus, network, or other connection mechanism 92.

Wireless communication interface 86 includes an antenna structure (e.g., one or more antennas or antenna elements) 94, which can be tower mounted or provided in some other manner, configured to transmit and receive over the air interface and thereby facilitate communication with served UEs. Further, the wireless communication interface includes a transceiver 96 and power amplifier 98 supporting air interface communication according to the LTE protocol. Network communication interface 88 may then comprise one or more wired and/or wireless network interfaces (such as an Ethernet interface) through which the base station may transmit and receive data over a backhaul connection with SGW 20 as discussed above.

Controller 90, which may be integrated with wireless communication interface 86 or with one or more other components of the eNodeB, may then be configured to manage communication over the air interface, including managing CSI reporting. By way of example, controller 90 may be configured to (i) cause the antenna structure to provide an antenna radiation pattern defining a coverage area, (ii) serve the UE in the coverage area defined by the antenna radiation pattern, (iii) determine the antenna radiation pattern provided by the antenna structure to serve the UE in the coverage area, (iv) select, based on the determined antenna radiation pattern, a CSI reporting rate, and (v) responsive to selection of the CSI reporting rate, cause the UE to periodically report CSI to the base station according to the selected CSI reporting rate.

Controller 90 can be implemented using hardware, software, and/or firmware. For example, controller 90 can include one or more processors and a non-transitory computer readable medium (e.g., volatile and/or non-volatile memory) that stores machine language instructions or other executable instructions. The instructions, when executed by the one or more processors, may cause controller 90, and thus the eNodeB, to carry out the various base station operations described herein.

FIGS. 4-6, described by way of example above, may correspond to at least some instructions executed by the controller 90 in FIG. 7 to perform the above described functions associated with the present disclosure. It is also within the scope and spirit of the present disclosure to omit steps, include additional steps, and/or modify the order of steps presented above.

Exemplary embodiments have been described above. Those skilled in the art will understand, however, that changes and modifications may be made to these embodiments without departing from the true scope and spirit of the invention.

What is claimed is:

1. A method of managing channel state information (CSI) reporting rate in a wireless communication system, the method comprising:
    radiating, by a base station, to provide an antenna radiation pattern defining a coverage area, wherein the antenna radiation pattern has a physical configuration in space;
    serving, by the base station, a user equipment device (UE) in the coverage area defined by the antenna radiation pattern;
    using the antenna radiation pattern as a basis for selecting a particular CSI reporting rate from among a plurality of available CSI reporting rates by (i) determining a set of antenna radiation parameters used by the base station to provide the antenna radiation pattern, (ii) accessing data that maps a plurality of antenna radiation patterns to the plurality of available CSI reporting rates, (iii) looking up the determined set of radiation pattern parameters in the data to identify the particular CSI reporting rate in the data that corresponds with the determined set of radiation pattern parameters, and (iv) selecting the identified CSI reporting rate; and
    responsive to selecting the CSI reporting rate, causing the UE to periodically report CSI to the base station according to the selected CSI reporting rate.

2. The method of claim 1, wherein the plurality of available CSI reporting rates are mapped to the plurality of antenna radiation patterns based on a physical configuration of each antenna radiation pattern.

3. The method of claim 2, wherein the data comprises a table, and wherein the antenna radiation patterns having physical configurations with a relatively greater quantity of nulls are mapped to relatively higher CSI reporting rates in the table and the antenna radiation patterns having physical configurations with a relatively lesser quantity of nulls are mapped to relatively lower CSI reporting rates in the table.

4. The method of claim 2, wherein the plurality of available CSI reporting rates are mapped to the plurality of antenna radiation patterns based on a beam width of each antenna radiation pattern.

5. The method of claim 1, wherein the antenna radiation pattern is a first antenna radiation pattern, the particular CSI reporting rate is a first CSI reporting rate, and the method further comprises:
    while serving the UE, the base station changing from the first antenna radiation pattern to a second antenna radiation pattern;
    responsive to the base station changing to the second antenna radiation pattern, using the second antenna radiation pattern as a basis for selecting a second CSI reporting rate from among the plurality of available CSI reporting rates, the second CSI reporting rate being different from the first CSI reporting rate; and
    responsive to selecting the second CSI reporting rate, causing the UE to periodically report CSI to the base station according to the selected second CSI reporting rate instead of the first CSI reporting rate.

6. The method of claim 1, wherein the CSI includes information selected from the group consisting of a channel quality indicator (CQI), a precoding matrix indicator (PMI), and a rank indicator (RI).

7. The method of claim 1, wherein causing the UE to periodically report CSI to the base station according to the selected CSI reporting rate comprises transmitting, by the base station to the UE, a radio resource control (RRC) connection reconfiguration message including an operational parameter indicating the selected CSI reporting rate.

8. A base station comprising:
    an antenna structure for communicating over an air interface with a user equipment device (UE); and
    a controller configured to manage communication via the antenna structure over the air interface, wherein the controller is configured to:
    (i) cause the antenna structure to provide an antenna radiation pattern defining a coverage area, wherein the antenna radiation pattern has a physical configuration in space,
    (ii) serve the UE in the coverage area defined by the antenna radiation pattern,
    (iii) use the antenna radiation pattern as a basis to select a particular channel state information (CSI) reporting rate from among a plurality of available CSI reporting rates by (a) determining a set of antenna radiation parameters used by the base station to provide the antenna radiation pattern, (b) accessing data that maps a plurality of antenna radiation patterns to the plurality of available CSI reporting rates, (c) looking up the determined set of radiation pattern parameters in the data to identify the particular CSI reporting rate in the data that corresponds with the determined set of radiation pattern parameters, and (d) selecting the identified CSI reporting rate, and (iv) responsive to selection of the CSI reporting rate, cause the UE to periodically report CSI to the base station according to the selected CSI reporting rate.

9. The base station of claim 8, wherein the plurality of available CSI reporting rates are mapped to the plurality of antenna radiation patterns based on a physical configuration of each antenna radiation pattern.

10. The base station of claim 9, wherein the data comprises a table and wherein the antenna radiation patterns having physical configurations with a relatively greater quantity of nulls are mapped to relatively higher CSI reporting rates in the table and the antenna radiation patterns having physical configurations with a relatively lesser quantity of nulls are mapped to relatively lower CSI reporting rates in the table.

11. The base station of claim 9, wherein the plurality of available CSI reporting rates are mapped to the plurality of antenna radiation patterns based on a beam width of each antenna radiation pattern.

12. The base station of claim 8, wherein the UE is a first UE, the antenna radiation pattern is a first antenna radiation pattern, the particular CSI reporting rate is a first CSI reporting rate, and the controller is further configured to:
    (v) serve a second UE in a coverage area defined by a second antenna radiation pattern, wherein the second antenna radiation pattern is different than the first antenna radiation pattern;
    (vi) use the second antenna radiation pattern as a basis to select a second CSI reporting rate from among the plurality of available CSI reporting rates, wherein the second CSI reporting rate is different than the first CSI reporting rate; and
    (vii) responsive to the selection of the second CSI reporting rate, cause the second UE to periodically report CSI to the base station according to the second CSI reporting rate.

13. The base station of claim 8, wherein the antenna radiation pattern is a first antenna radiation pattern, the particular CSI reporting rate is a first CSI reporting rate, and the controller is further configured to:
    (v) while the base station serves the UE, change from the first antenna radiation pattern to a second antenna radiation pattern;
    (vi) responsive to the change to the second antenna radiation pattern, use the second antenna radiation pattern as a basis to select a second CSI reporting rate from among the plurality of available CSI reporting rates, wherein the second CSI reporting rate is different than the first CSI reporting rate; and
    (vii) responsive to the selection of the second CSI reporting rate, cause the UE to periodically report CSI to the base station according to the selected second CSI reporting rate instead of the first CSI reporting rate.

14. The base station of claim 8, wherein the CSI includes information selected from the group consisting of a channel quality indicator (CQI), a precoding matrix indicator (PMI), and a rank indicator (RI).

15. The base station of claim 8, wherein, to cause the UE to periodically report CSI to the base station according to the selected CSI reporting rate, the controller is further configured to transmit to the UE a radio resource control (RRC) connection reconfiguration message including an operational parameter indicating the selected CSI reporting rate.

16. A method of managing channel state information (CSI) reporting rate in a wireless communication system, the method comprising:

radiating, by a base station, to provide a first antenna radiation pattern defining a first coverage area and a second antenna radiation pattern defining a second coverage area, wherein a physical configuration of the second antenna radiation pattern is different than a physical configuration of the first antenna radiation pattern;
   serving, by the base station, a first user equipment device (UE) in the first coverage area defined by the first antenna radiation pattern and a second UE in the second coverage area defined by the second antenna radiation pattern;
   using the first antenna radiation pattern as a basis for selecting a first CSI reporting rate from among a plurality of available CSI reporting rates by (i) determining a first set of antenna radiation parameters used by the base station to provide the first antenna radiation pattern, (ii) accessing data that maps a plurality of antenna radiation patterns to the plurality of available CSI reporting rates, (iii) looking up the first set of radiation pattern parameters in the data to identify the first CSI reporting rate in the data that corresponds with the first set of radiation pattern parameters, and (iv) selecting the identified first CSI reporting rate;
   responsive to selecting the first CSI reporting rate, causing the first UE to periodically report CSI to the base station according to the first CSI reporting rate;
   using the second antenna radiation pattern as a basis for selecting a second CSI reporting rate from among the plurality of available CSI reporting rates by (i) determining a second set of antenna radiation parameters used by the base station to provide the second antenna radiation pattern, (ii) accessing the data that maps the plurality of antenna radiation patterns to the plurality of available CSI reporting rates, (iii) looking up the second set of radiation pattern parameters in the data to identify the second CSI reporting rate in the data that corresponds with the second set of radiation pattern parameters, and (iv) selecting the identified second CSI reporting rate, wherein the second CSI reporting rate is different than the first CSI reporting rate; and
   responsive to selecting the second CSI reporting rate, causing the second UE to periodically report CSI to the base station according to the second CSI reporting rate.

17. The method of claim 16, wherein the plurality of available CSI reporting rates are mapped to the plurality of antenna radiation patterns based on a physical configuration of each antenna radiation pattern.

18. The method of claim 17, wherein the data comprises a table and wherein the antenna radiation patterns having physical configurations with a relatively greater quantity of nulls are mapped to relatively higher CSI reporting rates in the table and the antenna radiation patterns having physical configurations with a relatively lesser quantity of nulls are mapped to relatively lower CSI reporting rates in the table.

19. The method of claim 17, wherein the plurality of available CSI reporting rates are mapped to the plurality of antenna radiation patterns based on a beam width of each antenna radiation pattern.

20. The method of claim 16, wherein the CSI includes information selected from the group consisting of a channel quality indicator (CQI), a precoding matrix indicator (PMI), and a rank indicator (RI).

* * * * *